United States Patent
Gueron et al.

(10) Patent No.: US 8,442,217 B2
(45) Date of Patent: May 14, 2013

(54) METHOD OF IMPLEMENTING ONE WAY HASH FUNCTIONS AND APPARATUS THEREFOR

(75) Inventors: Shay Gueron, Haifa (IL); Michael Kounavis, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 858 days.

(21) Appl. No.: 12/555,033

(22) Filed: Sep. 8, 2009

(65) Prior Publication Data

US 2010/0125728 A1 May 20, 2010

Related U.S. Application Data

(60) Provisional application No. 61/115,129, filed on Nov. 17, 2008.

(51) Int. Cl.
*H04L 29/06* (2006.01)
(52) U.S. Cl.
USPC .............................. 380/28; 713/168; 380/255
(58) Field of Classification Search .................. 713/150, 713/168, 174–176; 380/28, 255
See application file for complete search history.

(56) References Cited

U.S. PATENT DOCUMENTS

| 5,444,647 | A | * | 8/1995 | Komoda | 708/650 |
| 5,651,069 | A | * | 7/1997 | Rogaway | 380/28 |
| 2003/0212727 | A1 | * | 11/2003 | Macy et al. | 708/620 |
| 2007/0266244 | A1 | * | 11/2007 | Walker et al. | 713/168 |
| 2007/0291934 | A1 | * | 12/2007 | Volkovs et al. | 380/28 |
| 2008/0170700 | A1 | * | 7/2008 | Darba | 380/278 |

OTHER PUBLICATIONS

Gueron, Shay and Kounavis, Michael, "Vortex: A New Family of One Way Hash Functions based on Rijndael Rounds and Carry-less Multiplication" Intel Corporation Oct. 2008.

Gueron, Shay and Kounavis, Michael, "Vortex: A New Family of One-way Hash Functions Based on AES Rounds and Carry-less Multiplication" Intel Corporation, 2008.

* cited by examiner

*Primary Examiner* — Gilberto Barron, Jr.
*Assistant Examiner* — David Le

(57) ABSTRACT

A cryptographic system for encrypting a data stream to be transported over a network by using a one way hash function constructed according to Merkle-Damgard construction includes a plurality of Davies-Mayer structure modules. A Davies-Mayer module modifies two variables A and B according to at least four words by no more than three Advanced Encryption Standard (AES) block cipher rounds.

21 Claims, 3 Drawing Sheets

METHOD OF IMPLEMENTING ONE WAY HASH FUNCTIONS AND APPARATUS THEREFOR

This application claims priority from provisional application No. 61/115,129 filed Nov. 17, 2008, incorporated by reference herein in its entirety.

BACKGROUND OF THE INVENTION

Guaranteeing message and code integrity is very important for the security of applications, operating systems and the network infrastructure of the future Internet. Protection against intentional alteration of data may be supported using one way hash functions. A one way hash function is a mathematical construct that accepts as input a message of some length and returns a digest of much smaller length. One way hash functions are designed in such a way that it is computationally infeasible to find the input message by knowing only the digest. One way hash functions which have been in use today may include, for example, algorithms known in the art as, MD-5 and SHA1 and the like.

One disadvantage with using these algorithms may be that they are time consuming when implemented in software. One way hash functions may involve multiple shifts, XOR and ADD operations which they combine in multiple rounds in order to produce message digests. Because of this reason, one way hash functions consume a substantial number of processor clocks when executing, which limits their applicability to high speed secure network applications (e.g., 10 Gbps e-commerce transactions), or protection against malware (e.g., virus detection or hashed code execution).

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
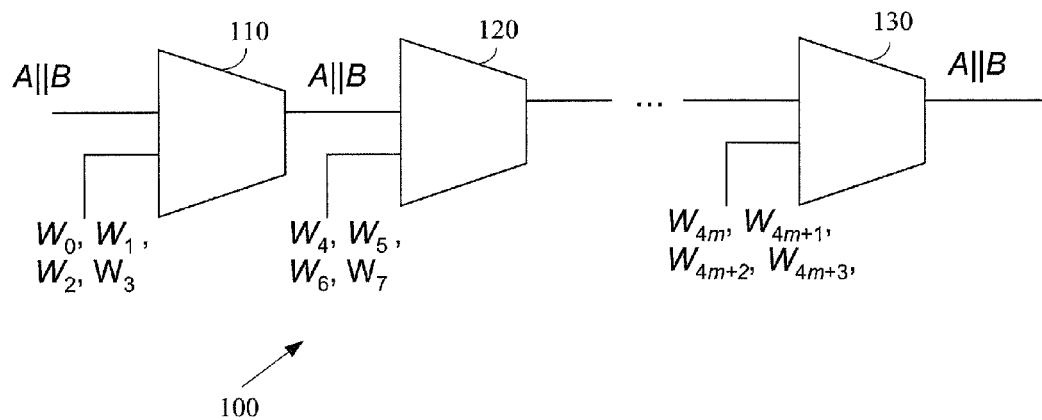
FIG. 1 is an illustration of a Merkle-Damgard construction to provide a one way hash function according to an exemplary embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However it will be understood by those of ordinary skill in the art that the present invention may be practiced without these specific details. In other instances, well-known methods, procedures, components and circuits have not been described in detail so as not to obscure the present invention.

Some portions of the detailed description, which follow, are presented in terms of algorithms and symbolic representations of operations on data bits or binary digital signals. These algorithmic descriptions and representations may be the techniques used by those skilled in the security of computer data and/or security of computer communication arts to convey the substance of their work to others skilled in the art.

Unless specifically stated otherwise, as apparent from the following discussions, it is appreciated that throughout the specification discussions utilizing terms such as "processing," "computing," "calculating," "determining," or the like, refer to the action and/or processes of a computer and/or computing system and/or communication processor, or similar electronic computing device, that manipulate and/or transform data represented as physical, such as electronic, quantities within the computing system's registers and/or memories into other data similarly represented as physical quantities within the computing system's memories, registers or other such information storage, transmission or the like.

The term "plurality" may be used throughout the specification to describe two or more components, devices, elements, parameters and the like. For example, "plurality of processor cores" describes two or more processor cores, although the scope of the present invention is not limited to this example.

Some embodiments of the invention may be implemented, for example, using a machine-readable medium or article which may store an instruction or a set of instructions that, if executed by a machine, cause the machine to perform a method and/or operations in accordance with embodiments of the invention. Such machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, assembly language, machine code, or the like.

In the art of cryptography some basic terms and mathematical function may be used. Terms and functions that may be used with embodiments of the invention will be described now.

According to embodiments of the invention a block may be defined as a predetermined size of a portion of a data stream and/or a digital message. The data stream and/or the digital message may include any number of desired bits that are divided into a desired number of block(s). A block size may measured by bits. For example a block may include 512 bits, if desired.

A one-way compression function is a function that transforms two fixed length inputs to an output of the same size as one of the inputs. The transformation is "one way", meaning that it is difficult given a particular output to compute inputs which compress to that output; in other words a one-way function may be a function that is easy to compute but hard to invert. For example, it is easy to calculate the output when the inputs to the function are known. However, if only the output is known it may be unfeasible to calculate the inputs and if the output and one of the inputs are known it may be unfeasible to calculate the other input, although the scope of the present invention is not limited in this respect.

An Advanced Encryption Standard (AES) is a block cipher. In cryptography the AES may also be known as Rijndael. AES may have for example, a fixed block size of 128 bits and a key size of 128, 192, or 256 bits, if desired. AES may operate on a 4×4 array of bytes (e.g., 1 bytes equals 8 bits), termed the "state". The AES cipher may be specified in terms of repetitions of processing steps that may be applied to make up rounds of keyed transformations between an input plain-text and a final output of cipher-text. A set of reverse rounds may be applied to transform cipher-text back into the original plain-text using the same encryption key. For example, a high-level cipher algorithm of AES may be as follows:

---
KeyExpansion using predetermined key schedule
Initial Round
    AddRoundKey
Rounds
    SubBytes - a non-linear substitution step where each byte is replaced
    with another according to a lookup table.
    ShiftRows - a transposition step where each row of the state is shifted
    cyclically a certain number of steps.
    MixColumns - a mixing operation which operates on the columns of
    the state, combining the four bytes in each column
    AddRoundKey - each byte of the state is combined with the round
    key; each round key is derived from the cipher key using a key
    schedule.
Final Round (no MixColumns)
    SubBytes
    ShiftRows
    AddRoundKey
---

A Galois field is defined in abstract algebra as a finite field that contains only finitely many elements. Multiplication in a Galois field ($2^{128}$) includes carry-less multiplication of the 128 bit operands to generate a 256 bit result. It also includes the reduction modulo of the irreducible polynomial $g=g(x)=x^{128}+x^7+x^2+x+1$, where g is called a pentanomial because it may be represented as a 128 bit string with only 5 bits equal to 1.

A Carry-less multiplication may known in the art as Galois field multiplication (GFMUL) and may be defined, for example as follows:

---
Input:   A, B (n bits)
Output:  C (2n bits)
C [i] = XOR (j=0..i, A[j] & B[i-j])       for i=0...n-1
C [i] = XOR (j=i+1-n..n-1, A[j] & B[i-j]) for i=n...2n-1
C [2n] = 0
---

A Merkle-Damgard construction is a method to build a cryptographic hash function. For example, a cryptographic hash function is able to process an arbitrary-length message into a fixed-length output. This may be achieved by dividing an input of the message up into a series of equal-sized blocks, and operating on them in sequence using a one-way compression function that processes a fixed-length input into a shorter, fixed-length output. The Merkle-Damgard hash function may divide the input into blocks, and process the blocks one at a time with the compression function, by combining a block of the input with the output of the previous round.

A Davies-Meyer one-way compression function may feed each block of a message ($m_i$) as a key to a block cipher. The Davies-Meyer one-way compression function may feed a previous hash value ($H_{i-1}$) as the plaintext to be encrypted. An output cipher text may XORed ($\oplus$) with the previous hash value ($H_{i-1}$) to produce the next hash value ($H_i$). For example, in the first round when there is no previous hash value the Davies-Meyer one-way compression function may use a constant pre-specified initial value ($H_0$).

In a mathematical notation Davies-Meyer may be described as:

$$H_i = E_{m_i}(H_{i-1}) \oplus H_{i-1}$$

For example, if the block cipher uses 256-bit keys then each message block ($m_i$) may include a 256-bit block of the message. According to another example, if the same block cipher uses a block of 128 bits then the input and output hash values in each round is 128 bits. Variations of this method replace XOR with other group operations, such as, for example addition on 32-bit unsigned integers.

A substitution box (S-box) may take some number of input bits, m, and transform them into some number of output bits, n. An m×n S-box may be implemented for example as a lookup table with $2^m$ words of n bits each, although the scope of the present invention is not limited to this example.

A Matyas-Meyer-Oseas structure is a one-way compression function that may be considered as a dual (the opposite) of Davies-Meyer. The Matyas-Meyer-Oseas may feed each block of the message ($m_i$) as the plaintext to be encrypted. The output cipher text may be XORed ($\oplus$) with the same message block ($m_i$) to produce the next hash value ($H_i$). The previous hash value ($H_{i-1}$) is fed as the key to the block cipher. In the first round when there is no previous hash value it uses a constant pre-specified initial value ($H_0$). If the block cipher has different block and key sizes the hash value ($H_{i-1}$) will have the wrong size for use as the key. The cipher may have other special requirements on the key. Then the hash value is first fed through the function g( ) to be converted/padded to fit as a key for the cipher. In mathematical notation Matyas-Meyer-Oseas may be described as:

$$H_i = E_{g(H_{i-1})}(m_i) \oplus m_i$$

A Miyaguchi-Preneel structure is a one-way compression function which is an extended variant of Matyas-Meyer-Oseas. The Miyaguchi-Preneel structure may feed each block of the message ($m_i$) as the plaintext to be encrypted. The output cipher text is then XORed ($\oplus$) with the same message block ($m_i$) and then also XORed with the previous hash value ($H_{i-1}$) to produce the next hash value ($H_i$). The previous hash value ($H_{i-1}$) is fed as the key to the block cipher. In the first round when there is no previous hash value it uses a constant pre-specified initial value ($H_0$). In mathematical notation Miyaguchi-Preneel may be described as:

$$H_i = E_{g(H_{i-1})}(m_i) \oplus H_{i-1} \oplus m_i$$

According to embodiments of the invention, a one way hash function may be built from security algorithms which may be used as building blocks to achieve fast mixing of output bits across a large number of input bits. For example, the Merkle-Damgard construction may be used as a framework to construct a compression function from AES rounds and a merging technique based on Galois Field (GF(2)) multiplication, if desired.

For example, three successive AES rounds may be used for mixing of output bits across 128 input bits, if desired. Furthermore, in order to provide mixing across sets of 128 input bits, a merging function based on Galois Field (GF(2)) multiplication may be used. In other exemplary embodiments of the invention, mixing may be accomplished through combinations of AES rounds and merging functions according to some embodiments of the invention.

Turning first to FIG. 1, an illustration of a Merkle-Damgard construction 100 to provide a one way hash function according to an exemplary embodiment of the invention is shown. According to this exemplary embodiment, Merkle-Damgard construction 100 may include a one way hash function that may achieve mixing by using an embodiment of the invention. The one way hash function may be depicted with embodiments of the invention as Vortex-1, although it should be understood that embodiments of the invention are not limited to this name. For example, Merkle-Damgard construction 100 may include a plurality of Vortex-1 processing modules 110, 120 and 130. Vortex-1 processing modules may include a Davies-Mayer structure of Vortex-1, if desired.

According to some embodiments of the invention, Vortex-1 processing modules 110, 120 and 130 may process an input stream as a sequence of 512-bit blocks. The stream may be padded with e.g. ones ('1'). For example, if the length of the stream is not a multiple of 512 minus 96, then the stream may be padded with zeros ('0') following the '1'. The last 96 bits indicate the configuration of the one way hash function (e.g., 32 bits) and the length of the stream (e.g., 64 bits). Vortex-1 processing modules 110, 120 and 130 may operate on two, for example 128-bit variables A and B initialized to some constant values. Vortex-1 processing modules 110, 120 and 130 may process each block using AES rounds modifying the values of A and B and may returns the concatenation of A and B (A∥B) which may be inputted to a next processing module, if desired. According to this exemplary embodiment, words $W_0, W_1, W_2, W_3$ may inputted to Vortex-1 processing module 110, $W_4, W_5, W_6, W_7$ may inputted to Vortex-1 processing module 120 and $W_{4m}, W_{4m+1}, W_{4m+2}, W_{4m+3}$ may inputted to Vortex-1 processing module 130.

Figure 2:
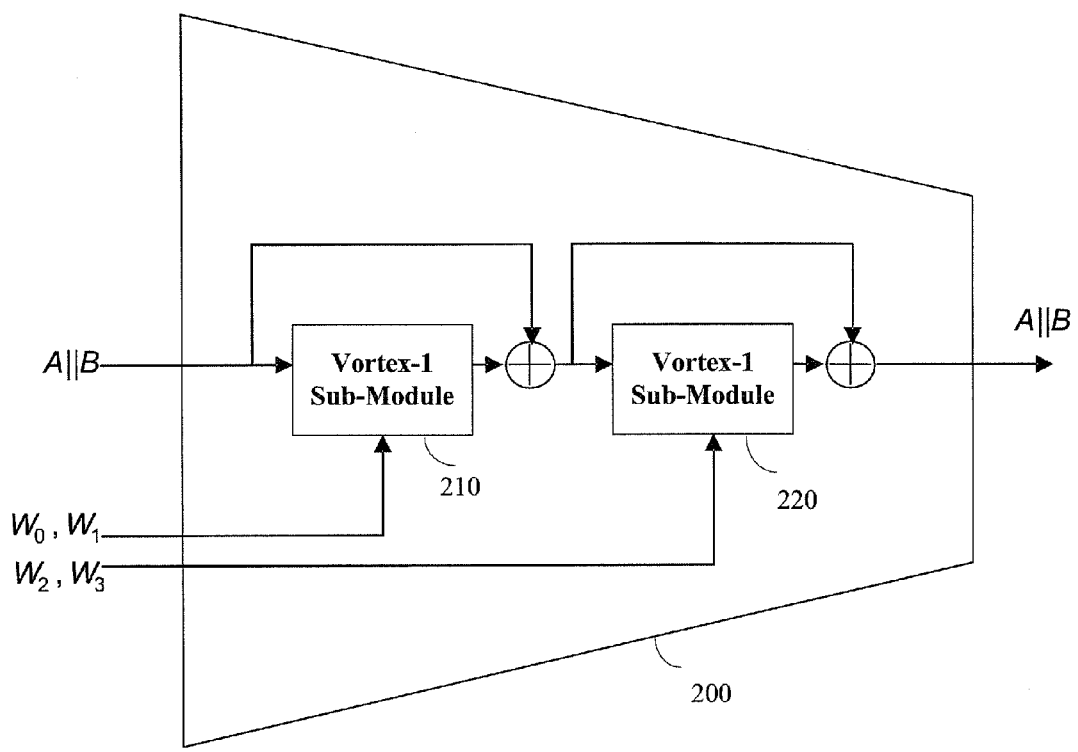
FIG. 2 is an illustration of Davies-Mayer structure of Vortex-1 processing module according to some exemplary embodiments of the invention.

According to embodiments of the invention, Merkle-Damgard construction 100 may be implemented by hardware, by software and/or any combination of hardware and software. For example, Merkle-Damgart construction 100 may be implemented by set of instructions that are performed by a processor and/or may be construct from logic array, memory, transistors and/or any other circuitry, if desired Turning to FIG. 2, an illustration of Davies-Mayer structure of a Vortex-1 processing module 200 according to some exemplary embodiments of the invention is shown. According to this exemplary embodiment, Vortex-1 processing module 200 may be divided into two sub-modules 210 and 220 that able to process blocks of 256 bits each, if desired. Sub-module 210 may process words $W_0$ and $W_1$ of 128 bits each and sub-module 220 may process words $W_2$ and $W_3$ of 128 bits each. Vortex-1 processing module 200 may operate on two 128-bit variables A and B initialized to some constant values. Vortex-1 sub-modules 219 and 220 may process each block using AES rounds modifying the values of A and B. Vortex-1 processing module 200 may return in the end of the AES rounds performed by sub-modules 210 and 220 a concatenation of A and B (A∥B), although the scope of the present invention is not limited to this example.

Figure 3:
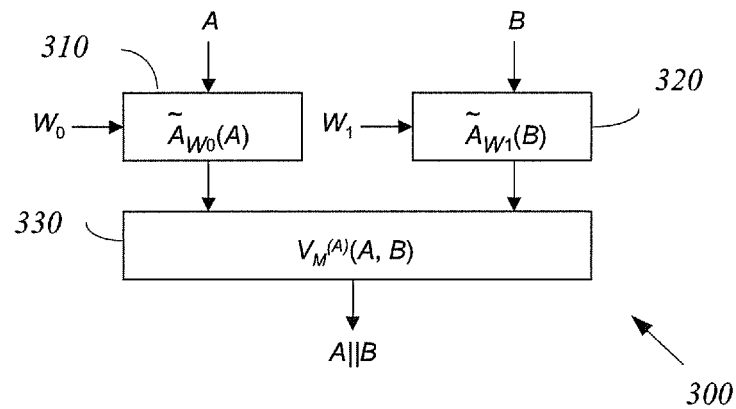
FIG. 3 is an illustration of a submodule structure according to some exemplary embodiments of the invention.

Turning to FIG. 3 an illustration of a submodule structure 300 according to some exemplary embodiments of the invention is shown. According to this exemplary embodiment of the invention, submodule 300 demonstrates an example of the structure of submodule 210 and/or submodule 220 of Vortex-1 processing module 200, if desired. Sub-module 300 may process block(s) according to for example the following exemplary algorithm.

One example of a method according to one embodiment for processing sub-module 300 is as follows:

```
vortex-1_sub-module (A, B, W_0, W_1)
{
    ; W_0, W_1 be the words of the current sub-module to be processed
    ; A, B be the value to be modified by AES rounds
    ; In a first operation of the algorithm (310) A value is modified; with
    AES rounds according to word W_0.
    ; In a second operation of the algorithm (320) B value is
    ; modified with AES rounds according to word W_1.
    ; A last operation of the algorithm (330) is the concatenation of A and
    ; B by a merging function V_M^(A)(A,B).
    A ← Ã_{W_0}(A)
    B ← Ã_{W_1}(B)
    A∥B ← V_M^(A)(A,B)
    Return (A, B)
}
```

It should be understood that according to embodiments of the invention other operations and/or series of operations may be used. Methods such as this example, and other methods herein, may be carried out by a processor operating software, by circuitry, or other devices and methods.

According to exemplary embodiments of the invention, the following algorithm or method may be use for processing block(s) by a Vortex-1 processing module (e.g., processing module 200). The method according to one embodiment may use vortex-1_sub-module (A, B, $W_0$, $W_1$) and vortex-1_sub-module (A, B, $W_2$, $W_3$) to process a block (e.g. data block, message block or the like).

```
Vortex-1_processing_module (A, B, W_0, W_1, W_2, W_3)
{
    (A,B) ← (A,B) ⊕ vortex-1_sub-module (A, B, W_0, W_1)
    ; uses W_0 and W_1
    (A,B) ← (A,B) ⊕ vortex-1_sub-module (A, B, W_2, W_3)
    ; uses W_2 and W_3
}
```

It should be understood that according to embodiments of the invention other operations or series of operations may be used.

Although the scope of the present invention is not limited to this example, the vortex-1 sub-module (e.g., sub-module 210 and/or sub-module 220) may be built upon two mathematical functions, if desired. According to one example of the invention, the first mathematical function may be a transformation function $\tilde{A}_x(x)$ which is a lightweight block cipher and the second mathematical function may be a merging function $V_M^{(A)}(A, B)$.

According to some exemplary embodiments, there may be approximately two instances of the transformation $\tilde{A}_x(x)$ in the vortex-1 sub-module (e.g., sub-module 210 and/or 220). The first and the second instance may process separately and independently on a different chaining variable among A, B. For example, an instance of the transformation function $\tilde{A}_x(x)$ may treat its input chaining variable as a plaintext and its input word from among $W_0, W_1, W_2, W_3$ as a key according to the Davies-Meyer structure, if desired.

According to one exemplary embodiment of the invention, the merging function $V_M^{(A)}(A, B)$ may combine the outputs of the first and second instances of $\tilde{A}_x(x)$ into the new value of the concatenation A∥B of the chaining variables A, B.

As described above, the transformation function $\tilde{A}_x(x)$ is a lightweight block cipher based on an AES round that encrypts x (for example x may be 128 bits long) using the key K. The transformation function $\tilde{A}_x(x)$ may use three AES rounds as specified in United State Federal Information Processing Standards 197 (FIPS-197) published on November 2001. For example and according to at least some embodiments of the invention, an AES round may consist of an SBox substitution phase, followed by the ShiftRows transformation, followed by the MixColumns transformation, followed by the round key addition in GF(2). The key schedule algorithm used by the transformation function $\tilde{A}_x(x)$ may be different from that of the AES as defined above.

According to one example, the transformation function $\tilde{A}_x(x)$ may use three 128-bit wide Rcon values $RC_1$, $RC_2$ and $RC_3$ to derive three round keys $RK_1$, $RK_2$ and $RK_3$ as follows:

$RK_1 \leftarrow \text{WordRotate}(SBox(K \boxplus RC_1))$ $RK_2 \leftarrow \text{WordRotate}(SBox(RK_1 \boxplus RC_2))$ $RK_3 \leftarrow \text{WordRotate}(SBox(RK_2 \boxplus RC_3))$ Wherein, '$\boxplus$' depicts addition modulo $2^{128}$, if desired.

As described above, a single AES round performs mixing across 32 bits. This may be accomplished through the combination of the S-Box and Mix Columns transformations. For example, two AES rounds may mix across 128 bits which may be accomplished through the combination of the subsequent Shift Rows and Mix Columns transformations. In another example, three AES rounds may be used to further strengthen the mixing performed.

Figure 4:
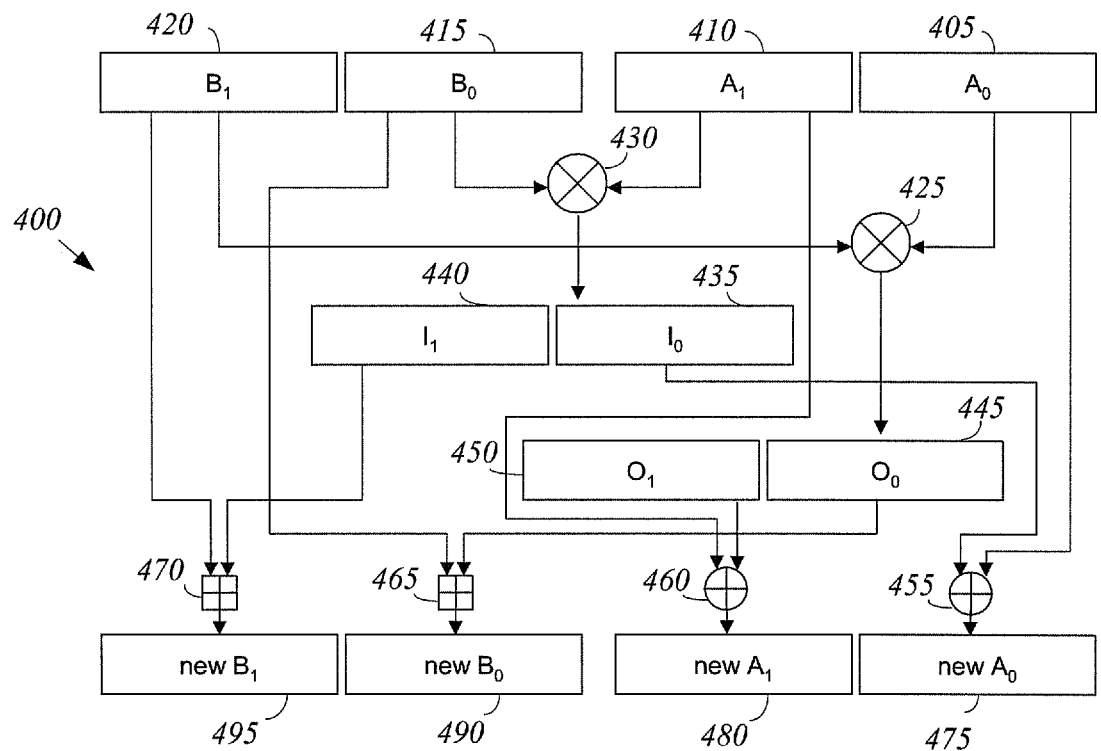
FIG. 4 is an illustration of a of a method of merging variables according to some exemplary embodiments of the invention.

FIG. 4 is an illustration of a block diagram of a method of merging variables 400 according to some exemplary embodiments of the invention. Although the scope of the present invention is not limited to this respect the method of merging variables 400 according to a merging function $V_M^{(4)}(A,B)$ may include a variable $A_0$ 405, a variable $A_1$ 410, a variable $B_0$ 415, a variable $B_1$ 420, '$\otimes$' carry-less multiplication multipliers 425 and 430, a variable $I_0$ 435, a variable $I_1$ 440, a variable $O_0$ 445, a variable $O_1$ 450, '$\oplus$' XORs 455 and 460 and $\boxplus$ addition modulo $2^{64}$ 470 and 465, if desired.

Although the scope of the present invention is not limited to this example, the merging function, $V_M^{(4)}(A,B)$ may operate as follows:

```
Merging Function V_M^(4)(A, B)
{
    let A = [A_1, A_0]
    let B = [B_1, B_0]
    O ← A_0 ⊗ B_1
    I ← A_1 ⊗ B_0
    let I = [I_1, I_0]
    let O = [O_1, O_0]
    return [B_1 ⊞ I_1, B_0 ⊞ O_0, A_1 ⊕ O_1, A_0 ⊕ I_0]
}
```

According to this example, chaining variable A may be split into $A_0$ and $A_1$ e.g., variables 405 and 410. Chaining variable B may be split into $B_0$ and $B_1$ e.g., variables 415 and 420. $A_0$ and $B_1$ may be multiplied by carry-less multiplication 425 which returns a variable O which may be split to $O_0$ and $O_1$ (e.g., variables 445, 450 respectively). $A_1$ and $B_0$ may be multiplied by carry-less multiplication 430 which returns a variable I which may be split to $I_0$ and $I_1$ (e.g., variables 435, 440 respectively). The merging function 400, $V_M^{(X)}(A, B)$ may return new values of $A_0$, $A_1$, $B_0$, $B_1$ (e.g., variables 475, 480, 490 and 495, respectively) by adding (XORs 460, 455) $A_1$ to $O_1$ and $A_0$ to $O_0$ and performing addition modulo $2^{64}$ by blocks 470 and 465 to $B_1$ to $I_1$ and $B_0$ to $I_0$, although it should be understood that the embodiments of the invention are not limited to this example.

Some embodiments of the invention that employ the above described one way hash function e.g., Vortex, are able to operate at a speed of 1.5 cycles per byte in CPUs with instruction set support for AES round computation and Galois Field (GF(2)) multiplication. Embodiments of the invention may be used for, for example, supporting both high speed secure networking, digital signatures and protection against malware in next generation computing systems, if desired.

Figure 5:
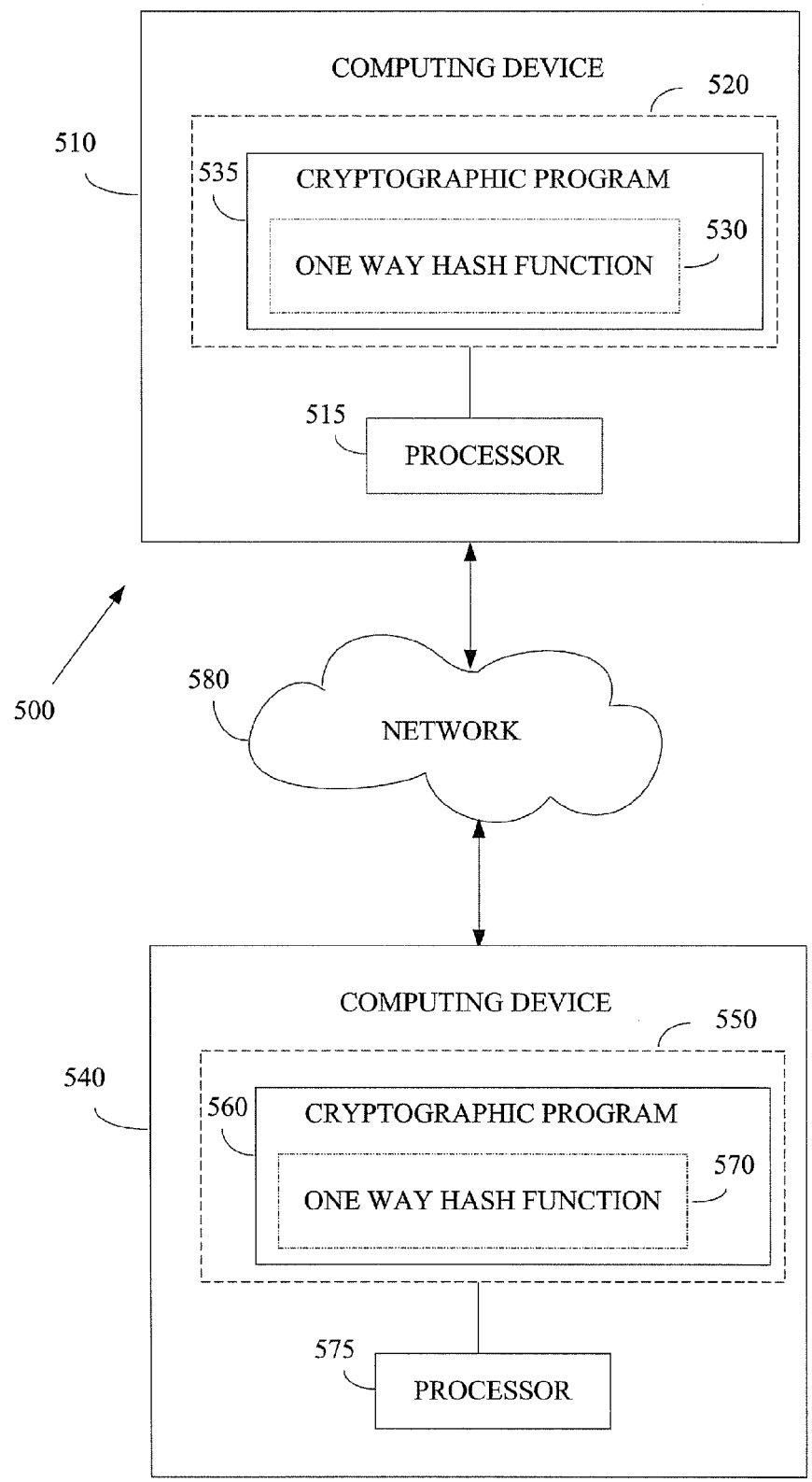
FIG. 5 is an illustration of a computing system utilizing a cryptographic system according to some exemplary embodiments of the invention.

Furthermore, embodiments of the present invention may be implemented using hardware, software, or a combination thereof and may be implemented in one or more computer systems or other processing systems. In one embodiment, the invention is directed toward one or more computer systems capable of carrying out the functionality described herein. In another embodiment, the invention is directed to a computing device. An example of a computing device 510 is illustrated in FIG. 5. Various embodiments may be described in terms of this example of computing devices 510, 540. However, other computer systems or computer architectures may be used with embodiments of the invention. One embodiment may incorporate a cryptographic process in a cryptographic program. In another embodiment, a cryptographic process may be incorporated in a hardware cryptographic device.

Turning to FIG. 5 an illustration of a computing system 500 utilizing a cryptographic system for encrypting data stream to be transported over a network according to some exemplary embodiments of the invention is shown. Although the scope of the present invention is not limited in this respect, computing system 500 may include computing devices 510 and 540 and a network 580. According to this exemplary embodiment, computing device 510 may include a memory 520 which may include a cryptographic program 535. Cryptographic program 535 may include a one way hash function 530 for example, a hash function which has been described above with FIGS. 1-4. A processor 515 is able to execute for example the instructions of cryptographic program 535 and hash function 530 to provide an encrypted data stream and/or to descript an encrypted data stream received from device 540.

Computing device 540 may include a memory 550 which may include a cryptographic program 560 and cryptographic program 560 may include a one way hash function 570. A processor 575 is able to execute the instruction of cryptographic program and hash function 570 to provide an encrypted data stream and/or to decrypt an encrypted data stream received from device 510.

According to exemplary embodiments of the invention memories 520 and 550 may be local random access memory (RAM), static RAM (SRAM), dynamic RAM (DRAM), fast page mode DRAM (FPM DRAM), Extended Data Out DRAM (EDO DRAM), Burst EDO DRAM (BEDO DRAM), erasable programmable ROM (EPROM) also known as Flash memory, RDRAM® (Rambus®) dynamic random access memory), SDRAM (synchronous dynamic random access memory), DDR (double data rate) SDRAM, DDRn (i.e., n=2, 3, 4, etc.), etc., and may also include a secondary memory (not shown).

The secondary memory may include, for example, a hard disk drive and/or a removable storage drive, representing a floppy disk drive, a magnetic tape drive, an optical disk drive, etc. The removable storage drive reads from and/or writes to a removable storage unit. The removable storage unit represents a floppy disk, magnetic tape, optical disk, etc., which is read by and written to by the removable storage drive. As will be appreciated, the removable storage unit may include a machine readable storage medium having stored therein computer software and/or data.

Processors 515 and 575 may include a single core processor, a multiple cores processor (e.g., two or more cores) a digital signal processor (DSP) or the like, or other processors.

According to embodiments of the invention, the cryptographic programs 535 and 560 may be a software application, firmware, an embedded program, hardware or similarly implemented program. The program may be stored in a non-volatile memory or storage device (e.g., a device storing instructions that, when executed by a processor, carry out embodiments of the present invention) or may be hardwired. For example, a software encryption program 535 may be stored in a system memory 520 and on a hard drive or similar non-volatile storage.

According to embodiment of the invention, cryptographic programs 535 and 560 may utilize any desired encryption protocol including secure sockets layer (SSL), Internet Protocol security (IPsec), Station-to-Station and similar protocols. In one example embodiment, the encryption program may include a Diffie-Hellman key-exchange protocol or an RSA encryption/decryption algorithm or the like.

Cryptographic programs 535 and 560 may include one way hash functions 530 and 570. Each of the one way hash functions 520 and 550 may be constructed according to Merkle-Damgard construction and may include a plurality of Vortex-1 processing modules which include a Davies-Mayer structure, if desired The cryptographic program may be used for communication with devices over a network 580. Network 580 may be a local area network (LAN), wide area network (WAN) or similar network. Network 580 may utilize any desired communication medium and/or protocol. In one example embodiment, network 580 may be the Internet. In another embodiment, computing devices 510 and 580 may communicate over a direct link including wireless direct communications.

In some embodiments of the invention, computing devices 510 and/or 540 may include a communications interface (not shown). The communications interface allows software and data to be transferred between the computing device and external devices. Examples of communications interfaces may include a modem, a network interface (such as an Ethernet card), a communications port, a PCMCIA (personal computer memory card international association) slot and card, a wireless LAN interface, etc. Software and data transferred via the communications interface are in the form of signals which may be electronic, electromagnetic, optical or other signals capable of being received by the communications interface. These signals are provided to the communications interface via a communications path (e.g., a channel). The channel carries the signals and may be implemented using wire or cable, fiber optics, a phone line, a cellular phone link, a wireless link, and other communications channels.

In another exemplary embodiment of the invention, processors 515 and/or 535 may output an encrypted data stream in a secured manner according to for example cryptographic programs 520 and 550. Cryptographic programs 520 and 550 may include a one way hash function constructed by extending at least one of a Merkle-Damgard and/or an Enveloped Merkle-Damgard construction. At least one of the Merkle-Damgard and/or the Enveloped Merkle-Damgard may include a plurality of processing modules. A module of the Merkle-Damgard and/or the Enveloped Merkle-Damgard may include an at least one compression function implemented using Rijndael round and carry-less multiplication processor instructions which if executed cause the processor to perform binary mixing both inside and across sets of predetermined number of bits.

According to this example the module may include at least one of Davies-Mayer, Matyas-Meyer-Oseas and/or Miyaguchi-Preneel structures which may be used to modify two variables A and B according to at least four message words by at least three Advanced Encryption Standard (AES) block cipher rounds.

According to another exemplary embodiment of the invention, the module may include at least one of Davies-Mayer, Matyas-Meyer-Oseas and Miyaguchi-Preneel structures which is used to modify two variables A and B according to at least four message words by at least three Rijndael rounds. The module may be split into two sub modules. A first sub-module to modify two variables A and B according to a first and second words and to return a concatenation of A and B (A∥B) and a second sub-module to modify the modified concatenation of A and B (A∥B) according to a third and fourth word and to return a new concatenation of A and B (A∥B). Each of the sub-modules may use at least one of Davies-Mayer, Matyas-Meyer-Oseas and Miyaguchi-Preneel structures to modify the variable A with AES rounds according to the first word and to modify the variable B with AES rounds according to the second word. The modified variables A and B may be merged by a merging function, if desired.

In another embodiments of the invention, the sub-module may use at least one of Davies-Mayer, Matyas-Meyer-Oseas and Miyaguchi-Preneel structures to modify the variable A with AES and/or with Rijndael 256 rounds according to the first word and to modify the variable B with Rijndael 256 rounds according to the second word, if desired.

According to some embodiments of invention the merging function may perform the flowing operation in order to merge the modified variables A and/or B:
  split variable A into $A_0$ and $A_1$;
  split variable B into $B_0$;
  multiply $A_0$ and $B_1$ using either a carry-less or an integer multiplication block to return a variable O which is split to $O_0$ and $O_1$;
  multiply $A_1$ and $B_0$ using either a carry-less or an integer multiplication block to return a variable I which is split to $I_0$ and $I_1$; and
  return new values of $A_0, A_1, B_0, B_1$ XOR-ing $O_1$ to $A_1$ and $I_0$ to $A_0$ and adding modulo $2^{64}$ $I_1$ to $B_1$ and $O_0$ to $B_0$.
It should be understood that the scope of the present invention is not limited in this respect.

In this document, the term "computer program product" may refer to the removable storage units, and signals. These computer program products allow software to be provided to computing devices 510 and/or 540. In an embodiment where the invention is implemented using software, the software may be stored in a computer program product and loaded into the computing device using the removable storage drive, a hard drive or a communications interface, if desired. The control logic (software), when executed by the computing device, causes the computing device to perform functions described herein.

According to embodiments of the invention some of the computing device may include a display (not shown) for displaying various graphical user interfaces (GUIs) and user displays. The display may be an analog electronic display, a digital electronic display a vacuum fluorescent (VF) display, a light emitting diode (LED) display, a plasma display (PDP), a liquid crystal display (LCD), a high performance addressing (HPA) display, a thin-film transistor (TFT) display, an organic LED (OLED) display, a heads-up display (HUD), and the like.

In another embodiment, the invention is implemented primarily in hardware using, for example, hardware components such as application specific integrated circuits (ASICs) using hardware state machine(s) to perform the functions described herein. In yet another embodiment, the invention is implemented using a combination of both hardware and software.

In the description above, numerous specific details are set forth. However, it is understood that embodiments of the invention may be practiced without these specific details. For example, well-known equivalent components and elements may be substituted in place of those described herein, and similarly, well-known equivalent techniques may be substituted in place of the particular techniques disclosed. In other instances, well-known circuits, structures and techniques have not been shown in detail to avoid obscuring the understanding of this description.

Embodiments of the present disclosure described herein may be implemented in circuitry, which includes hardwired circuitry, digital circuitry, analog circuitry, programmable circuitry, and so forth. These embodiments may also be implemented in computer programs. Such computer programs may be coded in a high level procedural or object oriented programming language. The program(s), however, may be implemented in assembly or machine language if desired. The language may be compiled or interpreted. Additionally, these techniques may be used in a wide variety of networking environments. Such computer programs may be stored on a storage media or device (e.g., hard disk drive, floppy disk drive, read only memory (ROM), CD-ROM device, flash memory device, digital versatile disk (DVD), or other storage device) readable by a general or special purpose programmable processing system, for configuring and operating the processing system when the storage media or device is read by the processing system to perform the procedures described herein. Embodiments of the invention may also be considered to be implemented as a machine-readable or machine recordable storage medium, configured for use with a processing system, where the storage medium so configured causes the processing system to operate in a specific and predefined manner to perform the functions described herein.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:

1. An apparatus comprising:
a processor to:
receive a data stream that includes a plurality of bits and process a one way hash function constructed by extending at least one of a Merkle-Damgard and an Enveloped Merkle-Damgard construction, the at least one of the Merkle-Damgard and the Enveloped Merkle-Damgard construction including a plurality of processing modules, wherein one of the processing modules includes at least one compression function implemented using Rijndael round and carry-less multiplication that, when executed, causes the processor to perform binary mixing both inside and across sets of predetermined number of bits of the data stream and to output an encrypted data stream.

2. The apparatus of claim 1, wherein said processing modules include at least one of Davies-Mayer, Matyas-Meyer-Oseas and Miyaguchi-Preneel structures, which is used to modify two variables A and B according to at least four message words by at least three Advanced Encryption Standard (AES) cipher rounds.

3. The apparatus of claim 1, wherein said processing modules include at least one of Davies-Mayer, Matyas-Meyer-Oseas, and Miyaguchi-Preneel structures, which is used to modify two variables A and B according to at least four message words by at least three Rijndael rounds.

4. The apparatus of claim 1, wherein said processing modules comprise:
a first sub-module to modify two variables A and B according to first and second words using Advanced Encryption Standard (AES) rounds and to return a concatenation of A and B (A||B); and
a second sub-module to modify the concatenation of A and B (A||B) according to a third and fourth word using AES rounds and to return a new concatenation of A and B (A||B).

5. The apparatus of claim 4, wherein the first and the second sub-modules are to process the plurality of bits of the data stream using at least one of Davies-Mayer, Matyas-Meyer-Oseas and Miyaguchi-Preneel structures to modify the variable A with Advanced Encryption Standard rounds according to the first word, to modify the variable B with Advanced Encryption Standard rounds according to the second word, and to merge the modified variables A and B by a merging function.

6. The apparatus of claim 4, wherein the sub-module using at least one of Davies-Mayer, Matyas-Meyer-Oseas and Miyaguchi-Preneel structures is to modify the variable A with Advanced Encryption Standard (AES) or Rijndael 256 rounds according to the first word, to modify the variable B with Rijndael 256 rounds according to the second word, and to merge the modified variables A and B by a merging function.

7. The apparatus of claim 5, wherein the merging function, when executed by at least one of the processing modules, is to:
split variable A into $A_0$ and $A_1$;
split variable B into $B_0$ and $B_1$;
multiply $A_0$ and $B_1$ using either a carry-less or an integer multiplication block to return a variable O which is split to $O_0$ and $O_1$;
multiply $A_1$ and $B_0$ using either a carry-less or an integer multiplication block to return a variable I which is split to $I_0$ and $I_1$; and
return new values of $A_0, A_1, B_0, B_1$ by XOR-ing $O_1$ to $A_1$ and $I_0$ to $A_0$, and by adding modulo 264 $I_1$ to $B_1$ and $O_0$ to $B_0$.

8. A cryptographic system comprising:
a computing device that includes a processor to generate an encrypted data stream that includes a plurality of bits, and to perform a one way hash function including at least one of a Merkle-Damgard construction and an Enveloped Merkle-Damgard construction, the at least one of the Merkle-Damgard construction and the Enveloped Merkle-Damgard construction including a plurality of processing modules, wherein one of the processing modules includes at least one compression function implemented using Rijndael round and carry-less multiplication to perform binary mixing both inside and across sets of predetermined number of bits of the data stream and to output an encrypted data stream.

9. The cryptographic system of claim 8, wherein said processing module includes at least one of a Davies-Mayer, Matyas-Meyer-Oseas and Miyaguchi-Preneel structure to modify two variables A and B according to at least four message words by at least three Advanced Encryption Standard (AES) cipher rounds.

10. The cryptographic system of claim 8, wherein said processing module includes at least one of a Davies-Mayer, Matyas-Meyer-Oseas and Miyaguchi-Preneel structure to modify two variables A and B according to at least four message words by at least three Rijndael rounds.

11. The cryptographic system of claim 8, wherein said processing module comprises:
 a first sub-module to modify two variables A and B according to a first word and a second word using Advanced Encryption Standard (AES) rounds, and to return a concatenation of A and B (A∥B); and
 a second sub-module to modify the modified concatenation of A and B (A∥B) according to a third word and a fourth word using AES rounds, and to return a new concatenation of A and B (A∥B).

12. The cryptographic system of claim 11, wherein the first and the second sub-modules are to process the plurality of bits of the data stream using at least one of Davies-Mayer, Matyas-Meyer-Oseas and Miyaguchi-Preneel structures to modify the variable A with Advanced Encryption Standard rounds according to the first word, to modify the variable B with Advanced Encryption Standard according to the second word, and to merge the modified variables A and B by a merging function.

13. The cryptographic system of claim 11, wherein a sub-module, using at least one of Davies-Mayer, Matyas-Meyer-Oseas and Miyaguchi-Preneel structures, is to modify the variable A with Advanced Encryption Standard (AES) or Rijndael 256 rounds according to the first word, to modify the variable B with Rijndael 256 rounds according to the second word, and to merge the modified variables A and B by a merging function.

14. The cryptographic system of claim 12, wherein the merging function, when executed by at least one of the processing modules, is to:
 split variable A into $A_0$ and $A_1$;
 split variable B into $B_0$ and $B_1$;
 multiply $A_0$ and $B_1$ using either a carry-less or an integer multiplication block to return a variable O, which is split to $O_0$ and $O_1$;
 multiply $A_1$ and $B_0$ using either a carry-less or an integer multiplication block to return a variable I, which is split to $I_0$ and $I_1$; and
 return new values of $A_0, A_1, B_0, B_1$ by XOR-ing $O_1$ to $A_1$ and $I_0$ to $A_0$, and by adding modulo $2^{64}$ $I_1$ to $B_1$ and $O_0$ to $B_0$.

15. A method comprising:
 receiving a data stream, which includes a plurality of bits;
 dividing the data stream into two or more blocks; and
 performing a one way hash function on each block of the plurality of blocks to output an encrypted data stream, wherein the one way hash function is constructed by extending at least one of a Merkle-Damgard and an Enveloped Merkle-Damgard construction, the at least one of a Merkle-Damgard and an Enveloped Merkle-Damgard construction including a plurality of processing modules, wherein at least one of the processing modules includes at least one compression function implemented using Rijndael round and carry-less multiplication to perform binary mixing both inside and across sets of predetermined number of bits of the data stream.

16. The method of claim 15, further comprising:
 modifying, by said processing module, variables A and B according to at least four message words by at least three Advanced Encryption Standard (AES) cipher rounds, wherein said processing module includes at least one of a Davies-Mayer, Matyas-Meyer-Oseas and Miyaguchi-Preneel structure.

17. The method of claim 15, further comprising:
 modifying, by said processing module, variables A and B according to at least four message words by at least three Rijndael rounds, wherein said processing module includes at least one of a Davies-Mayer, Matyas-Meyer-Oseas and Miyaguchi-Preneel structure.

18. The method of claim 15, further comprising:
 modifying, by a first sub-module of said processing module, variables A and B according to a first word and a second word using Advanced Encryption Standard (AES) rounds and returning a concatenation of A and B (A∥B); and
 modifying, by a second sub-module of said processing module, the concatenation of A and B (A∥B) according to a third and fourth word using AES rounds and returning a modified concatenation of A and B (A∥B).

19. The method of claim 18, further comprising:
 processing, by the first sub-module and the second sub-module, the plurality of bits of the data stream using at least one of a Davies-Mayer, Matyas-Meyer-Oseas and Miyaguchi-Preneel structure;
 modifying the variable A with Advanced Encryption Standard rounds according to the first word;
 modifying the variable B with Advanced Encryption Standard rounds according to the second word; and
 merging the modified variables A and B by a merging function.

20. The method of claim 19, further comprising:
 modifying, by the first sub-module or the second sub-module, the variable A with Advanced Encryption Standard (AES) or Rijndael 256 rounds according to the first word;
 modifying the variable B with Rijndael 256 rounds according to the second word; and
 merging the modified variables A and B by a merging function, wherein the first and second sub-modules use at least one of Davies-Mayer, Matyas-Meyer-Oseas and Miyaguchi-Preneel structures.

21. The method of claim 19, wherein the merging function, when executed by at least one of the processing modules, is to:
 split variable A into $A_0$ and $A_1$;
 split variable B into $B_0$ and $B_1$;
 multiply $A_0$ and $B_1$ using either a carry-less or an integer multiplication block to return a variable O, which is split to $O_0$ and $O_1$;
 multiply $A_1$ and $B_0$ using either a carry-less or an integer multiplication block to return a variable I, which is split to $I_0$ and $I_1$; and
 return new values of $A_0, A_1, B_0, B_1$ by XOR-ing $O_1$ to $A_1$ and $I_0$ to $A_0$, and by adding modulo $2^{64}$ $I_1$ to $B_1$ and $O_0$ to $B_0$.

* * * * *